United States Patent Office 3,442,754
Patented May 6, 1969

3,442,754
COMPOSITION OF AMINE-HALOHYDRIN RESIN AND CURING AGENT AND METHOD OF PREPARING WET-STRENGTH PAPER THEREWITH
Herbert H. Espy, Fairfax, Del., assignor to Hercules Incorporated, a corporation of Delaware
No Drawing. Filed Dec. 28, 1965, Ser. No. 517,130
Int. Cl. D21h 3/58, 3/36
U.S. Cl. 162—164
8 Claims

ABSTRACT OF THE DISCLOSURE

Disclosed is a composition of matter comprised of a resin selected from the group consisting of an aminopolyamide-epichlorohydrin resin and a polyalkylene polyamine-epichlorohydrin resin and a curing accelerator for the resin, the curing accelerator being a nitrogen-containing compound having an active hydrogen attached to a nitrogen atom such as ethylene diamine. The composition is adapted for use in the manufacture of wet-strength paper.

---

This invention relates to the papermaking art and particularly to the manufacture of wet-strength paper.

More particularly, this invention relates to novel compositions of matter adapted to impart wet-strength to paper treated therewith in a relatively short period of time.

It is known that certain cationic thermosetting resins formed by reacting a polyamide of a polyalkylene polyamine and an dicarboxylic acid with epichlorohydrin are very efficient wet-strength resins for paper. The dicarboxylic acids employed to produce the polyamide include diglycolic acid and saturated aliphatic dicarboxylic acids. Moreover, they can be used under alkaline as well as neutral or acid papermaking conditions, thus making the production of alkaline wet-strength paper economically feasible.

Paper sheeting comprised of the cationic resin in its thermosettable water-soluble state is subjected to heat, usually of the order of from about 100° C. to 120° C., whereby the resin is cured to its thermoset, insoluble, infusible state. It is the resin, in its thermoset state, that imparts wet-strength properties to the paper. The paper does not have satisfactory off-the-machine wet-strength properties. To obtain maximum cure, and hence maximum wet-strength properties, heating at the above temperatures requires a period of time of from about 1 hour to 3 hours. The heat treatment is expensive and time-consuming. At room temperature (about 23° C.), a period of time of at least about six months is required to provide maximum wet-strength properties.

In accordance with this invention, there are provided novel compositions of matter for use in imparting a high degree of wet-strength to paper in a relatively short period of time.

The compositions of this invention are in the form of aqueous solutions comprised of (A) a cationic thermosetting resin, to be detailed more fully hereinafter, and (B) an amine such as diethylene triamine and ethylene diamine. Amine (B) is referred to sometimes hereinafter as a "curing accelerator." The amount of amine (B) present will be, by weight, from about 3% to 100% of the weight of resin (A). The preferred range is from about 10% to 50%.

Broadly, the cationic thermosetting resin (A) is a water-soluble reaction product of epichlorohydrin and a polyamide derived from a polyalkylene polyamine and certain dicarboxylic acids.

In the preparation of the water-soluble cationic thermosetting resin, the dicarboxylic acid is first reacted with the polyalkylene polyamine, preferably in aqueous solution, under conditions such as to produce a water-soluble long chain polyamide containing the recurring groups —NH(C$_n$H$_{2n}$HN)$_x$—CORCO— where $n$ and $x$ are each 2 or more and R is the divalent organic radical of the dicarboxylic acid. This long chain polyamide is then reacted with epichlorohydrin to form a water-soluble cationic thermosetting resin Dicarboxylic acids employed to produce the polyamide are diglycolic acid and the saturated aliphatic dicarboxylic acids containing from 3 to 8 carbon atoms, such as malonic acid, succinic acid, glutaric acid, adipic acid, pimelic acid, and suberic acid. Of these, diglycolic acid and the saturated aliphatic dicarboxylic acids having from 4 to 6 carbon atoms in the molecule, namely, succinic acid, glutaric acid, and adipic acid, are most preferred. Mixtures of two or more of the dicarboxylic acids can be used, as well as mixtures of one or more of the dicarboxylic acids, with higher saturated aliphatic dicarboxylic acids such as azelaic acid and sebacic acid as long as the resulting long chain polyamide is water-soluble.

A variety of polyalkylene polyamines including polyethylene polyamines, polypropylene polyamines, polybutylene polyamines and the like can be employed to produce the polyamide, of which the polyethylene polyamines represent an economically preferred class. More specifically the polyalkylene polyamines employed are polyamines containing two primary amine groups and at least one secondary amine group in which the nitrogen atoms are linked together by groups of the formula —C$_n$H$_{2n}$— where $n$ is a small integer greater than unity and the number of such groups in the molecule ranges from two up to about eight and preferably up to about four. The nitrogen atoms may be attached to adjacent carbon atoms in the group —C$_n$H$_{2n}$— or to carbon atoms further apart, but not to the same carbon atom. Polyamines such as diethylenetriamine, triethylenetetramine, tetraethylenepentamine, dipropylenetriamine, and the like, which can be obtained in reasonably pure form can be used as well as mixtures thereof and mixtures of various crude polyamine materials. For example, the mixture of polyethylene polyamines obtained by the reaction of ammonia and ethylene dichlorides, refined only to the extent of removal of chlorides, water, excess ammonia, and ethylenediamine, can be employed in reaction with the dicarboxylic acid. Most preferred are the polyethylene polyamines containing from two to four ethylene groups, two primary amine groups, and from one to three secondary amine groups.

The term "polyalkylene polyamine" employed in the claims, therefore, refers to and includes any of the polyalkylene polyamines referred to above and to mixtures thereof.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine, or a heterocyclic diamine such as piperazine or the like for a portion of the polyalkylene polyamine. For this purpose up to about 60% of the polyalkylene polyamine can be replaced by a molecularly equivalent amount of the diamine. Usually a replacement of about 30% or less will serve the purpose.

The temperatures employed for carrying out the reaction between the dicarboxylic acid and the polyalkylene polyamine can vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures can be used. The time of reaction depends on the temperatures and pressures utilized and will ordinarily vary from about ½ hour to 2 hours, although shorter or longer reaction times can be utilized depending on reaction conditions. For best results, reaction is continued to substantial completion.

In carrying out the reaction, it is preferred to use an amount of dicarboxylic acid sufficient to react with substantially all the primary amine groups of the polyalkylene polyamine but insufficient to react with secondary amine groups. This will usually require a mole ratio of polyalkylene polyamine to dicarboxylic acid of from about 0.9 to 1 to about 1.2 to 1 and preferably from about 0.92:1 to 1.14:1. However, mole ratios of from about 0.8:1 to about 1.4:1 can be used with satisfactory results. Mole ratios outside these ranges are not recommended. Thus, mole ratios below about 0.8:1 result in a gelled product or one having a pronounced tendency to gel, and mole ratios above 1.4:1 result in low molecular weight polyamides. Such products do not produce efficient wet-strength resins when reacted with epichlorohydrin.

In converting the polyamide formed as above described to a cationic thermosetting resin, it is reacted with epichlorohydrin at a temperature of from about 45° C. to about 100° C., preferably between about 45° C. and 70° C., until the viscosity of a 20% solids solution at 25° C. has reached about C or higher on the Gardner-Holdt scale. To moderate the reaction, the reaction is preferably carried out in aqueous solution. Adjustment of pH is usually not necessary. However, since the pH decreases during the polymerization phase of the reaction, it may be desirable, in some cases, to add alkali to combine with at least some of the acid formed.

When the desired viscosity is reached, sufficient water is added to adjust the solids content of the solution to about 15% or less, the product cooled to about 25° C. and then stabilized by adding acid in an amount sufficient to reduce the pH at least to about 6 and preferably to about 5. Suitable acids for this purpose include hydrochloric acid, sulfuric acid, nitric acid, formic acid, phosphoric acid, and acetic acid. Mixtures of two or more acids can be used if desired.

In the polyamide-epichlorohydrin reaction, it is preferred to use sufficient epichlorohydrin to convert all secondary amine groups to tertiary amine groups and/or quaternary ammonium groups including cyclic structures. However, more or less can be added to moderate or increase reaction rates. In general, employing from about 0.5 mole to about 1.8 moles of epichlorohydrin per mole polyamide secondary amine provides satisfactory results. It is preferred to utilize from about 0.9 mole to about 1.5 moles of epichlorohydrin per mole of polyamide secondary amine group.

Reference is made to Patent 2,926,154 for a complete description of the method of preparing the resin solutions employed in carrying out this invention.

Curing accelerators employed in carrying out this invention include the aliphatic and aromatic polyamines having the structures (I) $\quad\quad H_2N-R-NH_2$ and (II) 

In the above Formulas I and II, R can be alkylene such as ethylene, trimethylene, tetramethylene, hexamethylene, and propylene

R can also be arylene such as phenylene, methyl phenylene, and

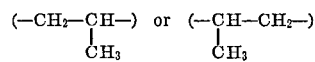

In Formula II, $n$ is a whole number of from 1 through 8.

Examples of polyamines include ethylenediamine; 1,4-butanediamine; 1,6-hexanediamine; o-, m-, and p-phenylenediamine; 1,8-octanediamine; 3,3-biphenyldiamine; 1,4-naphthalinediamine; 1,2,3 - benzenetriamine; diethylenetriamine; tripropylenetetramine; triethylenetetramine; heptaethyleneoctamine; 1,2-diamino-2-methylpropane; 2,3-diamino - 2 - methylbutane; 2,5 - diamino - 2,5 - dimethylhexene; and 2,6-diamino-2,6-dimethylheptane.

Alkanolamines can be used as curing accelerators in this invention also. The alkanolamines, also referred to as aminoalcohols, are selected from the group consisting of mono and di-alkanolamines. These compounds can be represented by the formula (III) 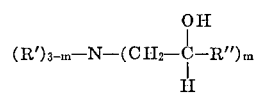

wherein $m$ is either 1 or 2, $R'$ can be hydrogen; alkyl including, for example, methyl, ethyl, n-propyl, and isopropyl; or aryl including, for example, phenyl, and methyl phenyl. $R''$ can be hydrogen or methyl.

Examples of monoalkanolamines include monoethanolamine, monoisopropanolamine, N,N - diethyl ethanolamine, N,N-diphenyl ethanolamine, and N,N-dimethyl isopropanolamine. Examples of dialkanolamines include diethanolamine, diisopropanolamine, N-methyl diethanolamine, N-phenyl diethanolamine, and N-methyl diisopropanolamine.

Other curing accelerators include aminoethylpiperazine, hydroxyethylpiperazine, aminoethylethanolamine, N,N-diethylethylenediamine, and N,N'-diethyl ethylenediamine.

In preparing the compositions of this invention, it is to be understood that mixtures of two or more of the above enumerated curing accelerators can be employed if desired.

The following examples illustrate the preparation of aqueous solutions of cationic thermosettable polyamide-epichlorohydrin resins used in this invention. All parts and percentages are by weight unless otherwise specified.

EXAMPLE 1

Two hundred twenty-five parts of diethylenetriamine and 100 parts of water are placed in a reaction vessel equipped with a motor-driven stirrer, thermometer and condenser. To this is added 290 parts of adipic acid. After the acid has dissolved in the diethylenetriamine, the resulting solution is heated and maintained at a temperature of from about 185° C. to 200° C. for 1½ hours. Vacuum from a water pump is then applied to the reaction vessel during the period required for the contents of the flask to cool to 140° C. following which 430 parts of H₂O is added. There is thus provided a polyamide solution which contains 52.3% solids and has an acid number of 2.1.

To 60 parts of the polyamide solution in a reaction vessel is added 225 parts of H₂O. This solution is heated to 50° C. and 12.5 parts of epichlorohydrin is slowly added over a period of 11 minutes. The contents of the flask is then heated to 60–70° C. until it has attained a Gardner viscosity of >E. Then 150 parts of H₂O is added to the product and it is cooled to 25° C. The pH of the solution is adjusted to about 5.0 by adding about 11 parts of 10% HCl. The product contains 9.0% solids and has a Gardner viscosity of C–D.

EXAMPLE 2

A polyamide is prepared from 319 parts of triethylenetetramine and 290 parts of adipic acid according to the procedure described in Example 1. The polyamide solution contains 49.8% solids, has a pH of 10.8, and has an acid number of 3.2.

Sixty-three parts of the polyamide solution is dissolved in 225 parts of H₂O. This solution is stirred and heated to 50° C. Twenty-five parts of epichlorohydrin is added slowly over a period of about three minutes. The solution is then heated to 60–70° C. until it reaches a viscosity of E (Gardner). It is then diluted with 225 parts of H₂O, cooled to 25° C., and adjusted to pH 5.0 with 10% HCl. The product, containing 8.4% solids anl having a Gardner viscosity of <C, is a highly satisfactory wet-strength resin for paper.

EXAMPLE 3

To a solution of 20.6 parts of diethylenetriamine in 10 parts of water in a reaction vessel, fitted with thermometer, stirrer, distilling head and nitrogen inlet tube, is added in six approximately equal portions 30.4 parts of recrystallized diglycolic acid. After the sixth acid addition, the temperature, which has increased from about 50° C. to 95° C., is raised slowly to 148° C. by means of a Wood's metal bath held at 175° C. The reaction mixture is held at a temperature of 138° to 148° C. for 2½ hours under partial reflux, during which the theoretical amount of water is collected. The product is then diluted with about 45 parts of hot water and cooled. The product contained 48.7% total solids and has an intrinsic viscosity of 0.111.

The above polyamide is reacted with epichlorohydrin in a manner similar to that of Example 1.

EXAMPLE 4

One hundred and eighty-three parts of triethylenetetramine and 40 parts of water are placed in a reaction vessel equipped with condenser, motor driven stirrer, and thermometer. To this is added 118 parts of succinic acid. The charge is then heated to 185° C. until 72 parts of water has been distilled off. A vacuum of 25 mm. is then applied removing about 5 parts of additional water. The product is then cooled to 140° C. and 200 parts of hot (90° C.) water is added. The product, a polyamide solution, contains 54.7% solids.

One hundred and fifty parts of the polyamide solution and 100 parts of water are heated to 55° C. and 81 parts of epichlorohydrin is added dropwise in 24 minutes. Heating is continued at 60–70° C. After 15 minutes, the viscosity of the resin is D (Gardner). Water (75 parts) is added and heating is continued until a viscosity of F–G is reached. This requires about one hour. Again 75 parts of water is added and the resin solution is heated at 60–70° C. until a viscosity of R is reached. Then 400 parts of water is added. The product has a pH of 6.5 and 14.3% total solids.

EXAMPLE 5

A polyamide is prepared from the following ingredients:

| | Parts |
|---|---|
| Diethylenetriamine | 204.4 |
| Ethylenediamine | 14.0 |
| Adipic acid | 290.0 |
| Water | 100.0 |

The procedure of Example 1 is followed with the following exceptions. (1) The reaction mixture is held between 180° C. and 195° C. for 45 minutes; (2) aspirator vacuum is used during this entire period; and (3) the mixture is cooled to 140° C. and diluted with 430 parts of distilled water (80° C.). The polyamide solution contains 52.4% total solids and has an acid number of 3.4.

To 60.5 parts of this polyamide solution is added 225.0 parts of water. This solution is heated to 50° C. and 11.25 parts of epichlorohydrin is added dropwise over a period of about 11 miuntes. The solution is then heated to 70–80° C. and held at this temperature until it has attained a viscosity of E Gardner-Holdt. It is then diluted with 173 parts of water and adjusted to a pH of about 5.0 wth dilute HCl. The product contains 8.9% solids and has a Gardner viscosity of B–C.

The following examples are illustrative of the invention. All parts and percentages are by weight unless indicated otherwise.

EXAMPLE 6

Six sheets of bleached kraft paper, 40 pound basis weight, are immersed for 30 seconds each in an aqueous solution of the resin of Example 1 containing by weight about 1% of the resin based on the weight of the solution. All sheets are squeezed to remove excess solution and to provide impregnated sheets containing, by weight, about 70% based on the weight of the dry sheet of resin solution. The sheets are air-dried overnight (about 18 hours) at room temperature (about 23° C.).

EXAMPLE 7

To a 1% aqueous solution similar to that of Example 6, there is added about 20% by weight of ethylenediamine based on the weight of the resin solids present in the solution. Six sheets of bleached kraft paper are separately treated and dried in the same manner as described in Example 6.

EXAMPLE 8

Example 7 is repeated using diethylenetriamine in place of the ethylenediamine.

Average wet-strength properties of the treated sheets of Examples 6, 7 and 8 are determined and the results are set forth in Table I below.

TABLE I

| | Wet tensile strength, lb./in. width |
|---|---|
| Example 6 | 1.3 |
| Example 7 | 2.7 |
| Example 8 | 3.6 |

Examples 9–16

In these examples, Example 7 is repeated using various amines and in varying amounts as indicated in Table II below. Average wet-strength properties of the treated sheets, measured after having been air-dried overnight (about 18 hours) at room temperature (about 23° C.), are also set forth in Table II.

TABLE II

| Ex. No. | Amine | Percent amine employed based on weight of resin | pH | Wet tensile strength, lb./in. width |
|---|---|---|---|---|
| 9 | Diethylenetriamine | 3 | 9.1 | 1.5 |
| 10 | do | 10 | 9.6 | 2.2 |
| 11 | do | 20 | 10.0 | 2.6 |
| 12 | do | 30 | 10.1 | 2.7 |
| 13 | do | 100 | 10.5 | 2.8 |
| 14 | Ethylenediamine | 10 | 9.9 | 2.5 |
| 15 | Triethylenetetramine | 10 | 9.6 | 1.4 |
| 16 | Tetraethylenepentamine | 9 | 9.6 | 1.7 |

Examples 17–25

In these examples, Example 7 is repeated using various curing accelerators and with the exception that the amount of curing accelerator used is 30% by weight instead of the 20% in Example 7. The curing accelerators employed are set forth in Table III below as are test results.

TABLE III

| Ex. No. | Curing Accelerator | pH of aqueous solution | Wet tensile strength, lb./in. width |
|---|---|---|---|
| Control | None | 9.5 | 1.6 |
| Do | do | 10.5 | 1.4 |
| 17 | Diethylenetriamine | 10.1 | 3.2 |
| 18 | Imino-bis(propylamine) | 10.4 | 3.0 |
| 19 | Hexamethylenediamine | 10.6 | 2.6 |
| 20 | Dipropylenetriamine | 10.0 | 2.7 |
| 21 | Monoethanolamine | 10.0 | 2.5 |
| 22 | Diethanolamine | 9.5 | 2.5 |
| 23 | N-ethyl diethanolamine | 9.3 | 2.5 |
| 24 | Aminoethyl ethanolamine | 9.9 | 2.4 |
| 25 | N,N-diethyl ethylenediamine | 10.0 | 2.4 |

Examples 26–34

In these examples, Example 7 is repeated using the various amines indicated in Table IV below which also shows test results. For the control set forth a 0.5% aqueous solution of diethylenetriamine is used without any cationic resin.

TABLE IV

| Ex. No. | Amine | pH of aqueous solution | Wet tensile strength, lb./in. width |
|---|---|---|---|
| Control | Diethylenetriamine | 11.1 | 0.2 |
| 26 | Ethylenediamine | 10.1 | 2.2 |
| 27 | Ethanolamine | 9.8 | 1.4 |
| 28 | Diethanolamine | 9.3 | 1.6 |
| 29 | N-ethyl diethanolamine | 9.1 | 1.8 |
| 30 | Hydroxyethyl piperazine | 9.1 | 2.1 |
| 31 | Dimethylamino ethanol | 9.5 | 1.9 |
| 32 | N,N-diethyl ethylenediamine | 9.9 | 2.2 |
| 33 | N,N-diethyl ethylenediamine | 10.0 | 1.7 |
| 34 | Aminoethyl ethanolamine | 9.7 | 2.3 |

While the compositions of this invention have been described above with reference to a specific cationic resin component, it has been further determined in accordance with this invention, that satisfactory results can be obtained by substituting for a portion thereof or for all thereof a hydrophilic alkylene polyamine-polyfunctional halohydrin polymer as more specifically disclosed and described in Patent 2,969,302, reference to which is hereby made. Thus, the curing accelerators of this invention can be employed also in combination with this hydrophilic alkylene polyamine-polyfunctional halohydrin polymer.

Alkylene polyamines which can be reacted with polyfunctional halohydrins are well known compounds having the general formula $H_2N(C_nH_{2n}NH)_xH$ where $n$ is an integer and $x$ is one or more. Examples of such alkylene polyamines are the alkylene diamines, such as ethylenediamine; propylene diamine-1:2; propylene diamine-1,3; and the polyalkylene polyamines, such as, for example, diethylenetriamine, triethylenetetramine, tetraethylenepentamine, dipropylenetriamine, and the similar polypropylene polyamines and polybutylene polyamines. The preferred halohydrin is epichlorohydrin.

The compositions of this invention impart wet-strength to paper when added thereto or incorporated therein in an amount of from about .05% to 5%, or more, based on the dry weight of the paper. The amount of resin to be added will depend on the degree of wet-strength desired in the finished product an is within the skill of those versed in the art.

It is to be understood that the above desrciption and working examples are illustrative of this invention and not in limitation thereof.

What I claim and desire to protect by Letters Patent is:

1. A composition of matter comprised of (A) a resin selected from the group consisting of (1) a water-soluble cationic thermosetting resin obtained by reacting a polyalkylene polyamine having two primary amine groups and at least one secondary amine group with a dicarboxylic acid selected from the group consisting of diglycolic acid and $C_3$–$C_8$ saturated aliphatic dicarboxylic acids to form a water-soluble, long-chain polyamide containing secondary amine groups, the mole ratio of polyalkylene polyamine to dicarboxylic acid being from about 0.8:1 to about 1.4:1, and then reacting the polyamide in aqueous solution with epichlorohydrin in a mole ratio of epichlorohydrin to secondary amine groups of said polyamide of from about 0.5:1 to about 1.8:1, (2) a hydrophilic alkylene polyamine-polyfunctional halohydrin polymer, and (3) mixtures thereof, and (B) a curing accelerator in an amount of from about 3% to 100% by weight based on the weight of resin (A), said curing accelerator being selected from the group consisting of (1) a compound having the structure (I) 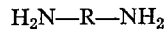

wherein R is alkylene or arylene, (2) a compound having the structure (II) 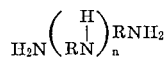

wherein R is alkylene or arylene and $n$ is a whole number, 1 through 8, (3) a compound having the structure (III) 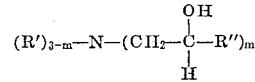

wherein $m$ is 1 or 2, when $m$ is 2, R′ is alkyl aryl, or hydrogen, and when $m$ is 1, R′ is at least one of the group consisting of hydrogen, alkyl, and aryl, and wherein R″ is hydrogen or methyl, (4) aminoethyl piperazine, (5) hydroxyethyl piperazine, (6) aminoethyl ethanolamine, (7) N,N-diethyl ethylenediamine, (8) N,N′-diethylethylenediamine, and (9) mixtures of two or more.

2. The composition of claim 1 wherein (A) is a water-soluble cationic thermosetting resin obtained by reacting a polyalkylene polyamine having two primary amine groups and at least one secondary amine group with a dicarboxylic acid selected from the group consisting of diglycolic acid and $C_3$–$C_8$ saturated aliphatic dicarboxylic acids to form a water-soluble, long-chain polyamide containing secondary amine groups, the mole ratio of polyalkylene polyamine to dicarboxylic acid being from about 0.8:1 to about 1.4:1, and then reacting the polyamide in aqueous solution with epichlorohydrin in a mole ratio of epichlorohydrin to secondary amine groups of said polyamide of from about 0.5:1 to about 1.8:1.

3. The composition of claim 2 wherein (B) is ethylene diamine.

4. The composition of claim 2 wherein (B) is diethylene triamine.

5. The composition of claim 2 wherein (B)) is ethanolamine.

6. The composition of claim 2 wherein (B) is diethanolamine.

7. A process which comprises incorporating in paper from about 0.05% to 5% by weight, based on the weight of the paper, of the composition of claim 1, and curing composition to a water-insoluble state, whereby there is provided a paper product having good wet-strength properties.

8. A paper product prepared in accordance with the process of claim 7.

References Cited

UNITED STATES PATENTS

| | | | |
|---|---|---|---|
| 2,595,935 | 5/1952 | Daniel et al. | 162—164 |
| 2,643,958 | 6/1953 | Kleiner et al. | 117—155 X |
| 2,849,411 | 8/1958 | Lehman et al. | |
| 2,882,185 | 5/1959 | Valko et al. | |
| 3,129,133 | 5/1964 | Doyle et al. | |
| 3,269,890 | 8/1966 | Gartner | 162—164 |
| 3,311,594 | 3/1967 | Earle | 162—164 X |

OTHER REFERENCES

Lee et al.: "Epoxy Resins," McGraw-Hill Book Co., New York, 1957, p. 41.

S. LEON BASHORE, *Primary Examiner.*

U.S. Cl. X.R.

117—155, 2; 260—78